Feb. 20, 1940.   G. W. DENISON ET AL   2,191,106
METHOD AND APPARATUS FOR MAKING BRICKS
Filed Feb. 10, 1937   2 Sheets-Sheet 1

INVENTOR.
GEORGE W. DENISON &
LEONARD A. DENISON
BY Bates, Goldrick, & Teare
ATTORNEYS Feb. 20, 1940.  G. W. DENISON ET AL  2,191,106
METHOD AND APPARATUS FOR MAKING BRICKS
Filed Feb. 10, 1937   2 Sheets-Sheet 2
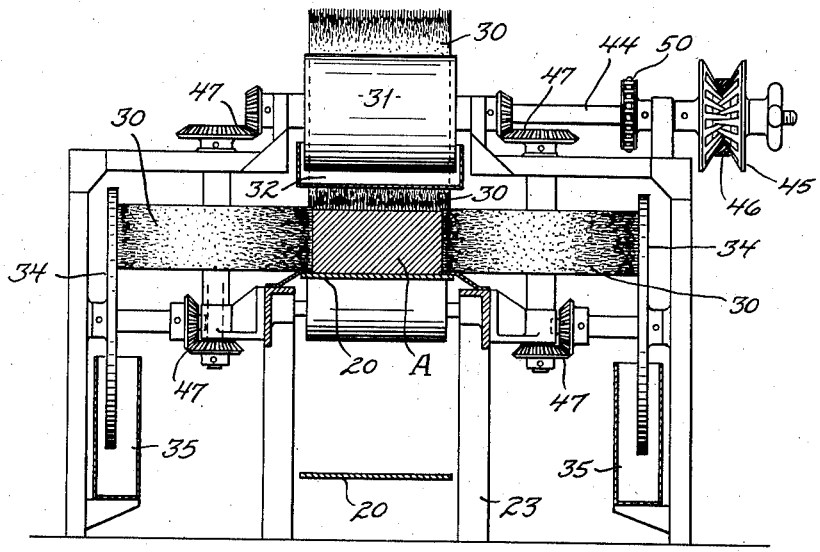
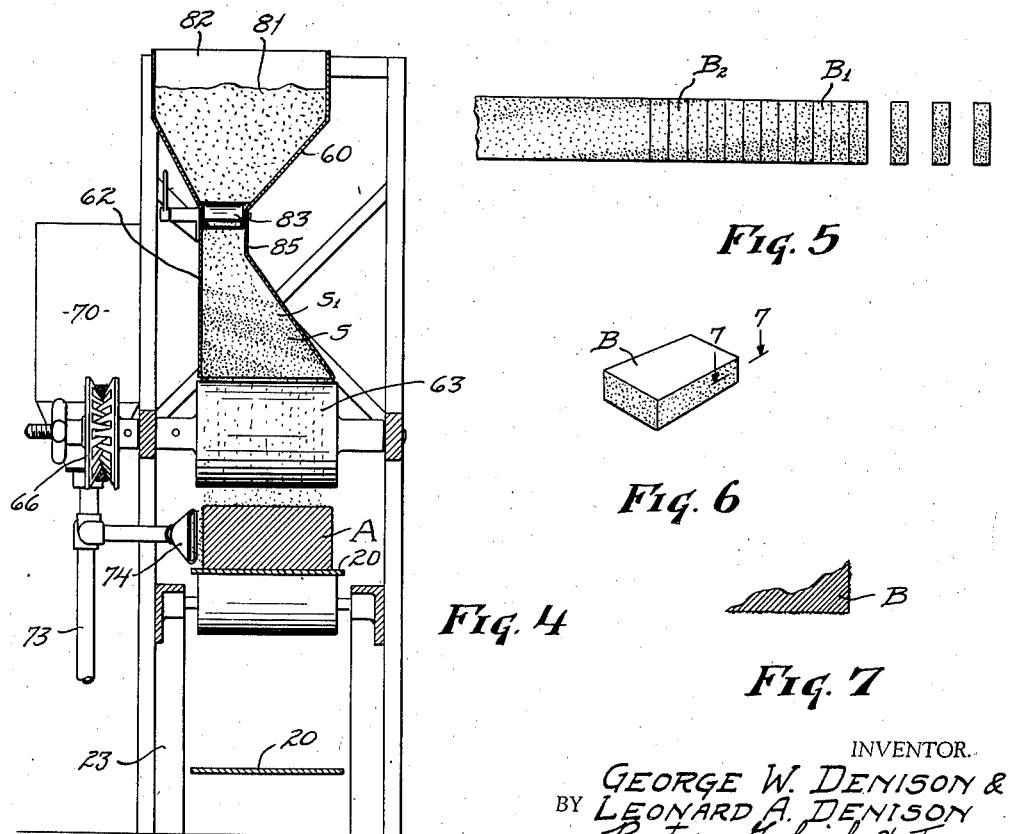
INVENTOR.
GEORGE W. DENISON &
BY LEONARD A. DENISON
Bates, Golrick, & Teare
ATTORNEYS Patented Feb. 20, 1940

2,191,106

UNITED STATES PATENT OFFICE 2,191,106

METHOD AND APPARATUS FOR MAKING BRICKS

George W. Denison, Bay Village, and Leonard A. Denison, Cleveland Heights, Ohio

Application February 10, 1937, Serial No. 125,134

4 Claims. (Cl. 25—1)

The present invention relates to an improved method and apparatus for manufacturing building brick and the like, and especially to a method and apparatus for economically producing a building brick or tile having the best possible structural qualities and at the same time a pleasing appearance or color. This, therefore, is the general object of the present invention.

Another object of the present invention is to provide a method and apparatus for regulating the color of building bricks and tile, so that the color of the blocks may vary slightly, one from another, and thereby break the monotony of the appearance of the walls and the like which may be constructed with such bricks or tile.

A further object of this invention is to provide an efficient and economical method and apparatus for regulating the color of building brick, tile and the like, so that the color of such brick may be extensively varied, one from another, or several different colors applied to the same brick or tile during its manufacture.

Other objects of the invention will become more apparent from the following description, reference being had to the accompanying drawings, in which we have illustrated a preferred form of apparatus for carrying out my improved method. The essential features of the invention will be summarized in the claims.

Figure 1:
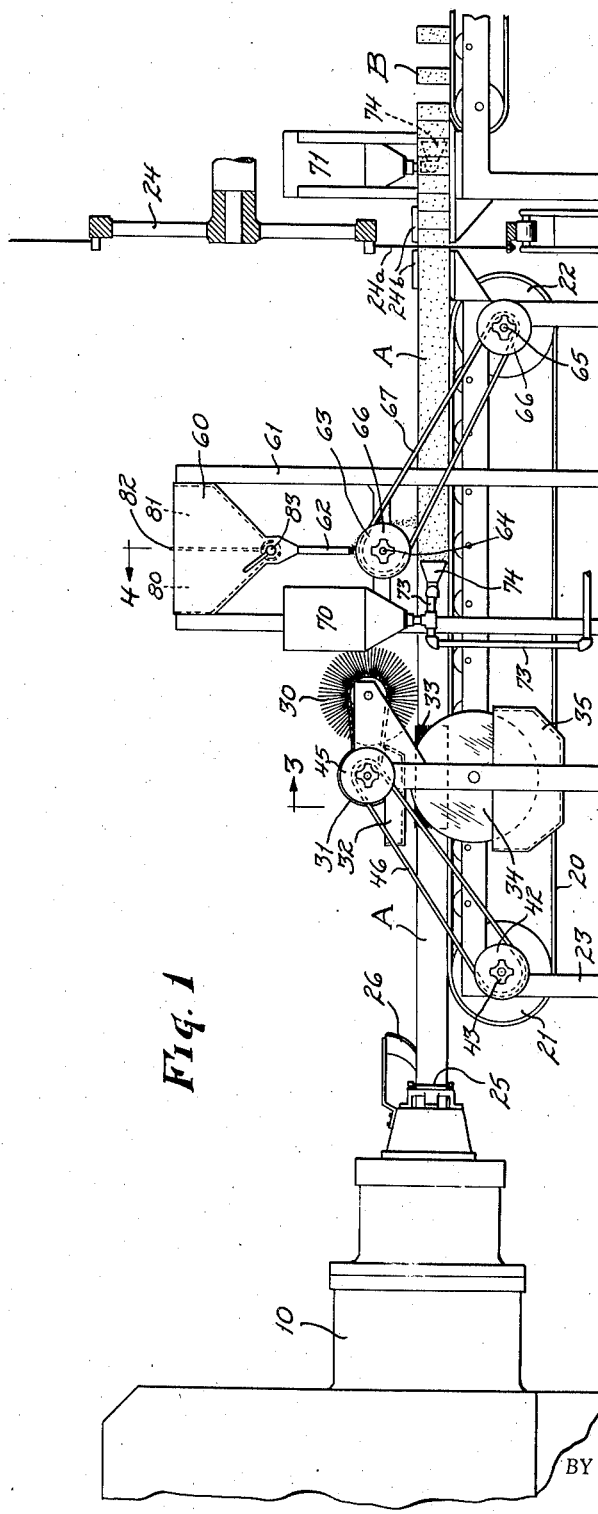
Figure 2:
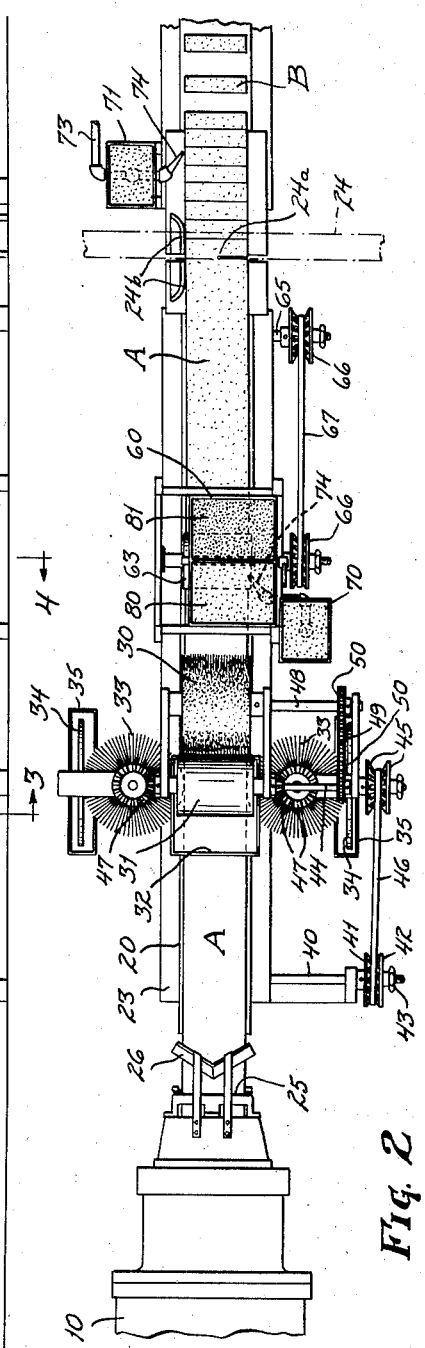

In the drawings, Fig. 1 is a side elevation of a preferred form of apparatus for carrying out my improved method; Fig. 2 is a plan view thereof; Figs. 3 and 4 are transverse sections of the apparatus illustrated in Fig. 1, the planes of the sections being indicated by the lines 3—3 and 4—4, respectively, of Fig. 1; Fig. 5 is a diagrammatic illustration of the clay formation during the process of manufacture of the brick; Fig. 6 is a perspective view of a brick formed by my improved method; Fig. 7 is a sectional detail, as indicated by the line 7—7 on Fig. 6.

The color of building bricks, to a great extent, is determined by the material or clay used in its manufacture. In many instances, the natural clay having the desired ceramic properties is of such composition that the color of the finished or baked brick or tile is either too light or too dark. To create a desired appearance, attempts have been made to regulate the color by under or over-burning the bricks, the former to lighten the color, and the latter to darken the color. However, such attempts have produced bricks, the structural characteristics of which were of an inferior quality. Such bricks have been either too soft and lacking in tensile strength or they have been brittle and difficult to handle.

It is sometimes desirable to provide an unusually light-colored brick or a deep red brick, and the clay available, while it may be suited for one or the other, usually will not produce either color as desired, without adding special pigments to the clay, thereby rendering the cost of the brick excessive. Our improved method not only permits the tone of the color to be regulated, as desired, but also permits the manufacture of bricks having radically different colors, regardless of the clay used to form the brick.

Our improved method comprises shearing a comparatively thin wafer from each of three surfaces of a clay column, as it is extruded from the usual clay extruding mill. This shearing eliminates the colloidal particles which come to the surface of the column during the extruding action. Thereafter, we apply to the column a comparatively thin layer of a ceramic "slip" material. This slip material is preferably about the consistency of ordinary paint. This composition generally includes one or more clays together with suitable fluxes and coloring oxides and pigments. This "slip" material is capable, when the brick is burned, of producing a brick, the treated surfaces of which will have the desired base color, and provides a bonding means to bond a coloring or toning agent to the brick.

The variation in the tone and/or color of the treated surfaces of the brick is accomplished by coating the slip covered surfaces, prior to the burning of the brick, with a relatively thin layer of sand. Sands of different characteristics are used—sands, which when burned, produce different tonal effects. Some of the sands used include a dry ceramic mixture of various materials, such as oxides to influence or supply the color. If desired, a flux may be added to the sand which, when the brick is burned, will cause the slip to glaze. These sands are intermingled in a sand-applying apparatus, so that the tone of the bricks may be changed, under the direct control of the operator, by changing the proportion of one sand to another, or by changing from the application of one type of sand to another type. This enables all of the bricks to be kiln fired at the same time, and, when moved from the kiln, are ready for shipment and erection in a wall.

In the apparatus shown in the drawings, and especially in Figs. 1 and 2, we have indicated at 10 the usual clay extruding mill, from which a column of clay or mud is extruded onto a continuous belt 20. The belt 20 is looped around a pair of drums 21 and 22, which are rotatably supported by a frame 23. The movement of the column, due to its extrusion from the mill 10, serves to propel the belt. The column of clay, supported by the belt 20, progresses through the usual cutting wheel 24, which shears the column into brick formations indicated at B. If desired, the belt 20 may be progressed by any suitable power. However, it has been found important to accurately synchronize the speed of the belt with the speed movement of the column.

As the column leaves the mill, wires 25 slice from the upper and side surfaces of the column comparatively thin layers of clay, thereby eliminating the colloidal particles which exist on those column surfaces, as well as slightly tending to roughen the column so that it may more readily receive the "slip" material. The clay thus removed is scraped or otherwise removed from the column, as, for instance, by a plow or scraper 26.

The "slip" material which comprises a ceramic composition of clay and may include coloring oxides or pigments, may be such that when the brick is burned it will have the desired color. This coloring material is preferably in the form of a liquid or semi-liquid, being of about the consistency of ordinary house paint. The slip material is applied to the upper surface of the moving column by a rotary brush 30, to which the slip is supplied by a fountain roll 31, the lower portion of which rides in a fountain or pan 32, containing the slip material.

The slip is applied to the sides of the column by rotary brushes 33, which receive the material from respective rotating discs 34, the lower edges of which are submerged in slip material carried by troughs 35. As shown, the various rolls and brushes, as well as the troughs 32 and 35, are supported by the framework 23.

The fountain roll 31 is driven by the drum 21, which supports the left-hand end of the belt (Fig. 1). The drum 21 is secured to a shaft 40, which is journalled in suitable bearings carried by the frame 23. Rigidly secured to the shaft 40 is one member 41 of a pulley, the other member 42 of which is slidably mounted on the shaft 40 for movement toward and away from the member 41. The inner face of each pulley member is bevelled to coact with the usual bevelled surfaces of a V-shaped driving belt 46. A suitable adjusting nut 43 controls the position of the pulley member 42 relative to the pulley member 41. Another pair of pulley members 45 are carried by the shaft 44 to which the roll 31 is secured. These members 45 are similar in all respects to the members 41 and 42, heretofore described. The arrangement of these pulleys is such that as the pulley members are separated from each other, the V-shaped belt 46 is looped around a smaller diameter than when the pulley members are drawn close together. Hence, it will be seen that by adjusting these compound pulley members the ratio of speed between the shafts 40 and 44 and therefore between the fountain roll and the moving conveyor belt is readily adjusted. Once adjusted, this ratio remains constant. The adjustment, however, enables the use of varied materials in the slip and increases the range of colors possible.

The brushes 33, as well as the discs 34, are driven from the shaft 44 by suitable gearing 47. However, if desired, they may be driven from the shaft 44 by a belt and pulley drive similar to that described in connection with the drive between the shafts 40 and 44. Likewise, the brush 30 may be driven by sprockets 50 on the shaft 44 and the brush shaft 48, and a suitable driving chain 49, or the brush may be driven from the shaft 44 by a pulley arrangement, such as described in connection with the drive for the roll 31.

From the foregoing it will be seen that the fountain rolls and discs, as well as the applicator brushes, are driven in timed relationship with the movement of the column of clay. This controlling of the fountain roll drive insures the application of a uniform coating of slip material to the column, even though lineal speed of the column may vary from time to time, depending upon the consistency of the clay in the mill. The application of a uniform coating is advantageous in that the layer of slip material will not craze off either during the burning of the brick or after the brick have been placed in use. We likewise find that if a thin uniform coating is maintained, the slip will bond with the column, even though the slip and the column have different drying and shrinkage characteristics and yet this thin coating will provide a product of uniform color and tone. Hence, by driving the slip applicating mechanism in timed relationship with the movement of the clay column, we secure these advantages.

It will be noted that the applicator brushes are driven so that their peripheries move in a direction opposite to the direction of the movement of the column with which they contact. This causes the material carried by the brush to be transferred to the moving column without projecting the brush bristles into the column and without passing the bristles of the brush across the coated column, thereby insuring and preserving the application of a uniform coating. Similarly, the fountain roll and the brush rotate in the same directions, so that their coacting surfaces move in opposite directions, thus insuring the application of a uniform coating to the applicator roll.

The tonal variations in the color of the bricks is diagrammatically illustrated by the shading in Fig. 5. This tonal variation is accomplished by the use of sand or rather, a variety of sands, each of which, when burned in the kiln, produces a different color or tonal variation. The sand is stored in a reservoir 60, supported above the moving column by suitable frame members 61. This reservoir, at its lowermost end, terminates in a comparatively narrow chute 62, the base of which extends substantially to the full width of the column, as indicated in Fig. 4, and which is in close proximity to a roll 63 (Fig. 1) mounted in suitable bearings in the framework 61 immediately above the moving column. The arrangement is such that unless the roller 63 is rotated, the sand is prevented from flowing from the bin or receptable by the roll, whereas, when the roller rotates, a thin film of sand is drawn by the roll from the chute 62 and spread onto the column, as indicated in Fig. 1. The amount of sand used, of course, depends upon the speed with which the roll 63 is rotated.

We find it highly advantageous to operate the roll 63 in direct synchronism with the speed of the moving column, so that the sand is applied in direct ratio to such movement, thereby enabling the coating to be regulated. To this end, the shafts 64 and 65, which support the sand roll 63 and the forward belt supporting rim 22, are provided with pulley assemblies 66, which are interconnected by a suitable V-shaped belt 67. The pulley members 66 are of a type heretofore described in connection with the pulley on the forward roll shaft 21, namely, they are adjustable to enable the speed ratio to be regulated, as desired.

Sand is applied to the sides of the column by air jets. As shown, we provide two reservoirs 70 and 71, one on each side of the moving column, the reservoir 70 being ahead of the shearing ring 24 and the reservoir 71 being so positioned as to enable the application of the sand therefrom to the column after it has passed the shearing member. This is because the far side of the column is supported in the region of the shearing wires 24a, by plate members 24b, which prevent distortion of the column during the shearing. By applying the sand to the side of the column, which contacts the plates 24b, after the column has passed the plates, we avoid the removal of the sand by frictional contact with the plates. Likewise, the slip applicator on this side of the column may be also positioned to apply the slip to the brick after the column has been cut and thereby prevent adherence of the slip to the supporting plates 24b.

Each of the reservoirs 70 and 71 are connected with respective conduits 73, to which air, under pressure, is applied by any suitable means, (not shown), thus forcing a blast of sand through the nozzle 74 onto the sides of the column. Suitable valves (not shown) are provided to control the quantity of sand and the pressure of the blast.

The operator may vary the tone or even the color of the brick by alternately placing small quantities of sand of different color characteristics in the reservoir, as desired. However, we prefer to provide the reservoir with two compartments 80 and 81, which are normally separated from each other by a wall 82, and are selectively opened to the chute 62 by a rotatable valve member 83.

It will be noted, from Fig. 5, that we have arranged the mechanism so that each brick may have a plurality of tonal areas. As illustrated, it will be noted that certain of the bricks, such as B1, have two tones therein, whereas others, such as B2, have three tonal areas. This is accomplished by so arranging the chute that adjacent its upper end it is restricted, as indicated in Fig. 4, in a direction transverse of the column, and gradually increasing its width until at the roll 63 it is substantially the width of the column. By maintaining the left-hand side of the chute perpendicular, as shown in Fig. 4, and sloping the other side to meet the conditions above set forth, the right-hand portion of the chute supplies sand to a greater area of the column than does the left-hand side, thus causing layers of sand to slope, as indicated at S and S1. Each layer of sand may have different color characteristics and may be controlled by manually shifting the valve 83. This valve may, however, be controlled from the driving mechanism by constantly rotating the valve through the medium of a driving belt or chain interconnecting the valve with the roll 63.

From the foregoing description, it is evident that the brick or tile may be cured, and fired or burned in the usual manner to insure the best possible structural characteristics, and yet produce a brick or tile having practically any color or tone desired. Likewise, the tone of the color of the brick or tile may be varied to create a pleasing appearance in any structure for which such bricks or tile may be used. Likewise, by varying the application of the sand the tone, or the color of the brick or tile varies from one brick to another. Thus, the brick or tile may be seasoned and fired in the order that they are received from the forming mechanism. They likewise may be moved from the kilns and erected in walls with a minimum amount of handling and yet the brick or tile, as they are placed in the structure, will vary from adjacent brick or tile in tone, thus breaking the monotony of the appearance of the structure.

We claim:

1. The method of making building brick or tile, comprising the steps of forming a continuous column of stiff clay, applying a thin even coating of coloring material to at least one surface of said column of sufficient thickness to conceal the natural color of the clay when subsequently burned in brick or tile form, applying sand to such coated surface while varying the kind of sand to vary the tonal effect of the colored slip on the bricks, and thereafter severing the column into individual units and burning the units to produce brick of substantially a predetermined color, but varying from each other in tone.

2. The method of making building bricks or tile, comprising the step of forming a continuous column of stiff clay, concealing the color of the surface of the column by continuously applying a coating of colored material of substantially uniform thickness to a surface of said column without disrupting the surface being treated while applying the coloring matter, applying sand to said coated surface while varying the kind of sand, thereby to vary the tonal effect of the colored material on the brick, and thereafter severing the column into individual units and burning the units to produce brick of substantially a predetermined color, but varying from each other in tone.

3. In a brick or tile-making machine having means to progress a substantially continuous column of clay including means for movably supporting the clay column, a hopper having a discharge passageway and means to deliver alternately materials having different characteristics, means associated with the hopper to convey such alternately discharged materials from the hopper and apply them to the moving column in a plurality of adjacent bands extending diagonally of the column and means driven by the movable column-supporting means for operating said last-named means.

4. In a brick-making apparatus having means to advance a column of art clay in a generally horizontal direction and including means for movably supporting the clay column, a hopper above said column-supporting means having a discharge passageway and means to deliver alternately materials having different characteristics, a receiving and discharging chute below the discharge passageway and receiving the material therefrom, the chute having a discharge passageway, a portion of which is out of vertical alignment with the discharge passage of the hopper and another portion of which is substantially in vertical alignment therewith, whereby the materials tend to stratify in inclined fashion, and means driven by the column-supporting means and associated with the discharge passageway of the chute to deliver the materials in a controlled manner to said moving column irrespective of variations in movement of the column.

GEORGE W. DENISON.
LEONARD A. DENISON.